US012604072B2

(12) United States Patent
Poh et al.

(10) Patent No.: US 12,604,072 B2
(45) Date of Patent: Apr. 14, 2026

(54) CAMERA AND INFRARED SENSOR SHUTTER

(71) Applicant: Dell Products L.P., Round Rock, TX (US)

(72) Inventors: Lai Say Poh, Singapore (SG); Suet Chan Law, Singapore (SG)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 18/515,773

(22) Filed: Nov. 21, 2023

(65) Prior Publication Data

US 2025/0168474 A1 May 22, 2025

(51) Int. Cl.
H04N 23/11 (2023.01)
H04N 23/73 (2023.01)

(52) U.S. Cl.
CPC ............. H04N 23/11 (2023.01); H04N 23/73 (2023.01)

(58) Field of Classification Search
CPC ......... H04N 23/11; H04N 23/55; H04N 23/73
See application file for complete search history.

(56) References Cited

U.S. PATENT DOCUMENTS

| | | | | |
|---|---|---|---|---|
| 8,147,149 B2 * | 4/2012 | Hirabayashi | ......... | G03B 11/043 |
| | | | | 359/511 |
| 8,313,255 B2 * | 11/2012 | Viglione | .................. | G03B 9/08 |
| | | | | 396/471 |
| 9,594,290 B2 | 3/2017 | Enomoto et al. | | |
| 9,798,220 B2 * | 10/2017 | Henry | .................... | H04N 23/55 |
| 11,550,947 B2 | 1/2023 | Kiyono et al. | | |
| 12,066,742 B2 * | 8/2024 | Mori | ....................... | G03B 11/04 |
| 2007/0274709 A1 * | 11/2007 | Ho | .......................... | G03B 17/00 |
| | | | | 396/448 |
| 2010/0323608 A1 | 12/2010 | Sanhedrai et al. | | |
| 2011/0206363 A1 * | 8/2011 | Han | .......................... | G03B 9/14 |
| | | | | 396/463 |
| 2013/0230294 A1 | 9/2013 | Sassa et al. | | |
| 2017/0140221 A1 | 5/2017 | Ollila et al. | | |
| 2020/0173633 A1 * | 6/2020 | Bai | .......................... | G03B 15/00 |
| 2021/0072618 A1 * | 3/2021 | Kanas | .................. | G03B 11/043 |
| 2022/0404684 A1 * | 12/2022 | Goh | ...................... | G03B 11/043 |
| 2022/0407996 A1 | 12/2022 | Goh et al. | | |

* cited by examiner

*Primary Examiner* — Boubacar Abdou Tchoussou
(74) *Attorney, Agent, or Firm* — Zagorin Cave LLP; Robert W. Holland

(57) ABSTRACT

An information handling system camera has physical security with a shutter that blocks the camera lens and a block member that separately blocks an infrared sensor. A ring rotates around the lens and engages with leaf members so that rotation of the ring opens and closes the leaf members. The block member extends inward from the ring towards the lens align with and block the infrared sensor when the leaf members block the lens and to expose the infrared sensor when the leaf members expose the lens.

19 Claims, 6 Drawing Sheets

CAMERA AND INFRARED SENSOR SHUTTER

BACKGROUND OF THE INVENTION

Field of the Invention

The present invention relates in general to the field of information handling system cameras, and more particularly to an information handling system camera and infrared sensor shutter.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include processing components in a housing that cooperate to process information. Stationary information handling systems, such as desktops and towers, support processing components in a stationary housing that interacts with an end user through peripheral devices, such as peripheral keyboards and displays. Portable information handling systems integrate processing components in a portable housing, including an integrated display and a power source, to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. Portable information handling systems also interact with end users through peripheral devices that offer enhanced usability, such as peripheral keyboards and displays.

Information handling systems have become communication tools that end users rely on to have video conferences with other end users through networks, such as the Internet. In a videoconference, a camera and microphone at each node captures video and audio of the end user at each node to present at other nodes at a display and speaker. Portable information handling systems typically integrate a camera in the portable housing. Often, peripheral displays will also include a camera so that a portable or stationary information handling system can use the camera to capture visual images of an end user viewing the peripheral display. Alternatively, a peripheral camera is sometimes used to help support videoconferencing. Typically, the peripheral camera clips onto the peripheral display so that an end user watching the display will appear to be looking into the camera.

In addition to supporting capture of visual images for a videoconference, information handling systems also often have an infrared sensor that will capture infrared visual images. Often infrared sensors operate with infrared illumination sources that illuminate the field of view so that time of flight logic can measure end user features and provide facial recognition. Infrared sensors support end user identification to aid in system security. For example, the camera monitors the field of view in front of the display to close down the presentation of visual images at the display unless an authorized end user is present. A difficulty with the use of cameras for this purpose is that a malicious attacker who gains control of the camera can use visual images captured by the camera to spy on an end user. To prevent this, cameras typically have a shutter that physically blocks the camera field of view unless an end user authorizes the capture of visual images.

Generally, one goal for cameras that integrate into information handling systems and displays is to have a small footprint that does not intrude on the end user experience. Camera image quality generally depends on the quality of the camera lens and sensor. A tradeoff typically exists between the quality of the lens, the size of the lens and the sensitivity of the light sensor that captures visual images. Further, even where it makes sense to include a higher quality and smaller lens for a particular camera in a smaller housing size, bulk system production tends to increase costs where multiple SKUs are involved. Thus, a common practice is to use the same camera in devices of different footprints to help drive down overall production costs. In this type of production environment, a common shutter is helpful as long as the shutter has a minimized footprint and adapts for use in system of different sizes. A difficulty with interchanging a common shutter across multiple different systems is that the shutter tends to have a larger size so that it adapts readily to the different displays.

SUMMARY OF THE INVENTION

Therefore, a need has arisen for a system and method which blocks camera and infrared sensor fields of view with a compact mechanical shutter.

In accordance with the present invention, a system and method are provided which substantially reduce the disadvantages and problems associated with previous methods and systems to block camera and infrared sensor fields of view. A camera security shutter closes leaf members over a visual image sensor by rotating a ring around the camera lens that engages with the leaf members, and blocks an infrared image sensor with a blocking member extending out from the ring that rotates over the infrared sensor.

More specifically, an information handling system processes information with a processor and memory that cooperate to execute instructions. A camera interfaced with the processor includes a visual image sensor that captures visual images and an infrared sensor that captures infrared images. A security shutter couples to a front face of the camera with a ring that rotates around the camera lens of a visual image sensor and engages first and second opposing leaf members with a slot, pin pivot structure. When the ring rotates in a first direction, the leaf members block the lens and, when the ring rotates in a second direction, the leaf members expose the lens. A blocking member extends from the ring to rotate in front of the infrared sensor when the leaf members block the visual image sensor lens and to expose the infrared sensor when the leaf members expose the visual image sensor. In one embodiment, the blocking member exposes the infrared sensor for part of the ring rotation when the leaf members block the visual image sensor so that the infrared sensor is available when the visual image sensor is blocked and the infrared sensor is also blocked by additional rotation of the ring.

The present invention provides a number of important technical advantages. One example of an important technical advantage is that a low profile security shutter blocks both a visual image sensor and an infrared sensor at a camera face. The separate blocking member for the infrared sensor provides security against unauthorized use of the infrared sensor without extending the size of the visual image sensor blocking structure. For example, a pair of leaf members having just enough surface area to block the visual image sensor lens fits into a camera face with minimal footprint while the separate blocking member extends from a ring structure to rotate in place. The security shutter will fit on a variety of different types and sizes of cameras, such as portable information handling system integrated cameras, peripheral display integrated cameras and peripheral cameras, so that a reduced cost and SKU count results.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A security shutter blocks capture of visual and infrared images from an information handling system camera with separate structures. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
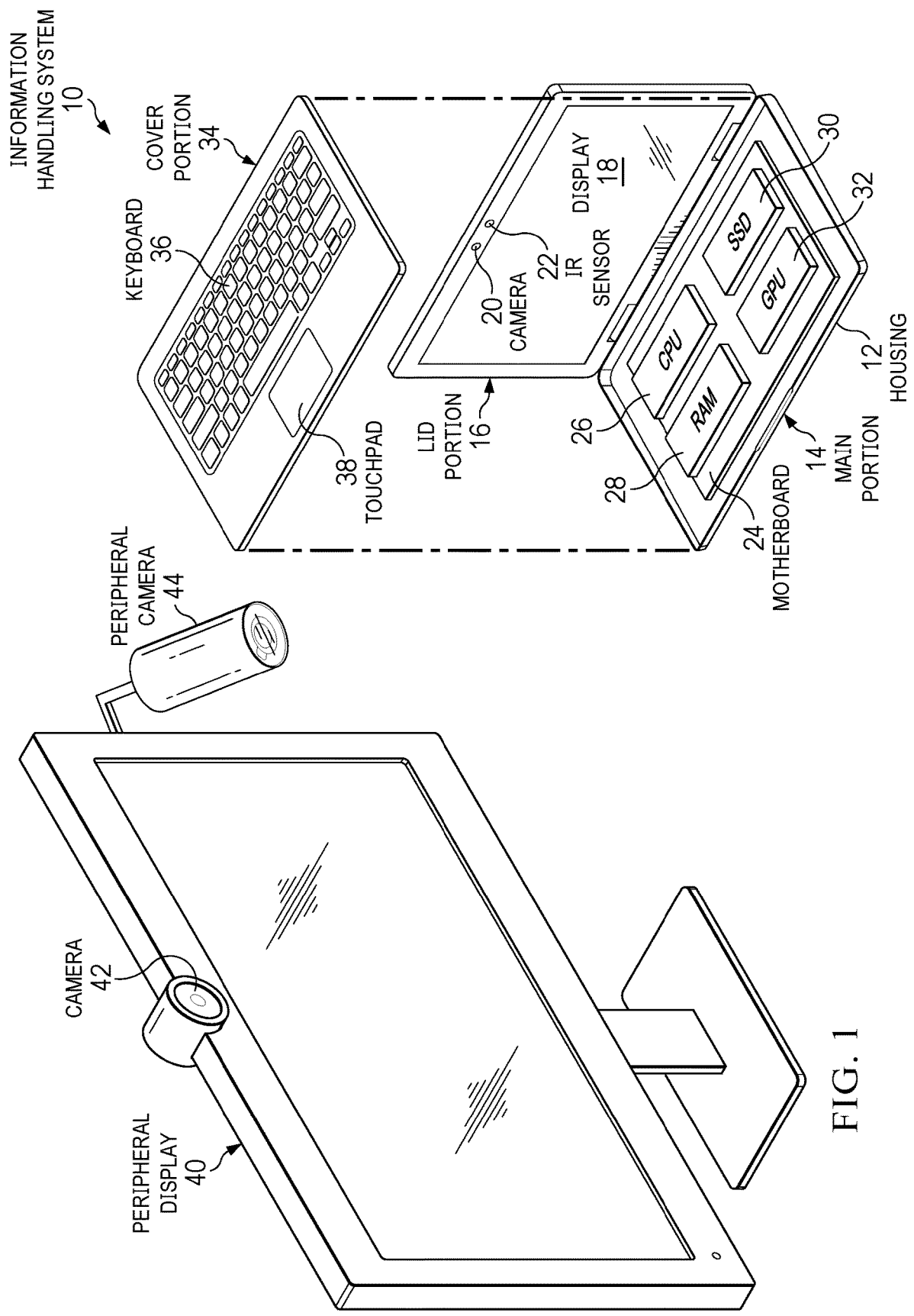
FIG. 1 depicts an information handling system interfaced with plural cameras that have security shutters to secure against unauthorized capture of visual and infrared images.

Referring now to FIG. 1, an information handling system 10 is depicted interfaced with plural cameras 20, 42 and 44 that have security shutters to secure against unauthorized capture of visual and infrared images. In the example embodiment, information handling system 10 is built into a portable housing 12 having a main portion 14 and a lid portion 16. In alternative embodiments, information handling system 10 may have a fixed housing or other configuration. Housing lid portion 16 has a display 18 coupled in place to present information as visual images, a camera 20 to capture visual images and an infrared sensor 22 to detect end user presence and to capture infrared images. Housing main portion 14 has a motherboard 24 coupled in place that includes wirelines to interface processing components that cooperate to process information. For example, a central processing unit (CPU) 26 executes instructions to process information in cooperation with a random access memory (RAM) 28 that stores the instructions and information. A solid state drive (SSD) 30 provides persistent storage that stores information when power is removed, such as flash integrated circuits that store an operating system and applications to execute on CPU 26. For example, the operating system supports execution of a videoconferencing application that uses camera 20 and infrared sensor 22 to communicate visual images with other network nodes. A graphics processing unit (GPU) 32 further processes information to present the information has visual images at display 18, such as by defining pixel values for presentation at the display. Housing main portion 16 interior is covered by a housing cover portion 34 that supports a keyboard 36 and touchpad 38 to accept end user inputs.

During operation, information handling system 10 executes an operating system and applications to accept end user inputs and to present outputs as visual images at display 18. In addition, a peripheral display 40 interfaces with information handling system 10 to present visual images. In the example embodiment, peripheral display 40 includes an integrated camera 42 that captures visual images in a field of view in front of peripheral display 40, such as an image of an end user viewing the display while engaging in a video conference. As an alternative, a peripheral camera 44 may capture visual images from different perspectives and communicate the visual images to information handling system 10. In each of the example cameras 20, 42 and 44, the camera housing and lens have different size constraints depending on the size of portable housing 12, peripheral display 40 and peripheral camera 44. In each case, a privacy shutter is present that will block both visual images and infrared images from being captured by the camera. As is described in greater detail below, the privacy shutter uses separate structures to block visual and infrared images so that the privacy shutter structure size is minimized and supports multiple camera configurations.

Figure 2:
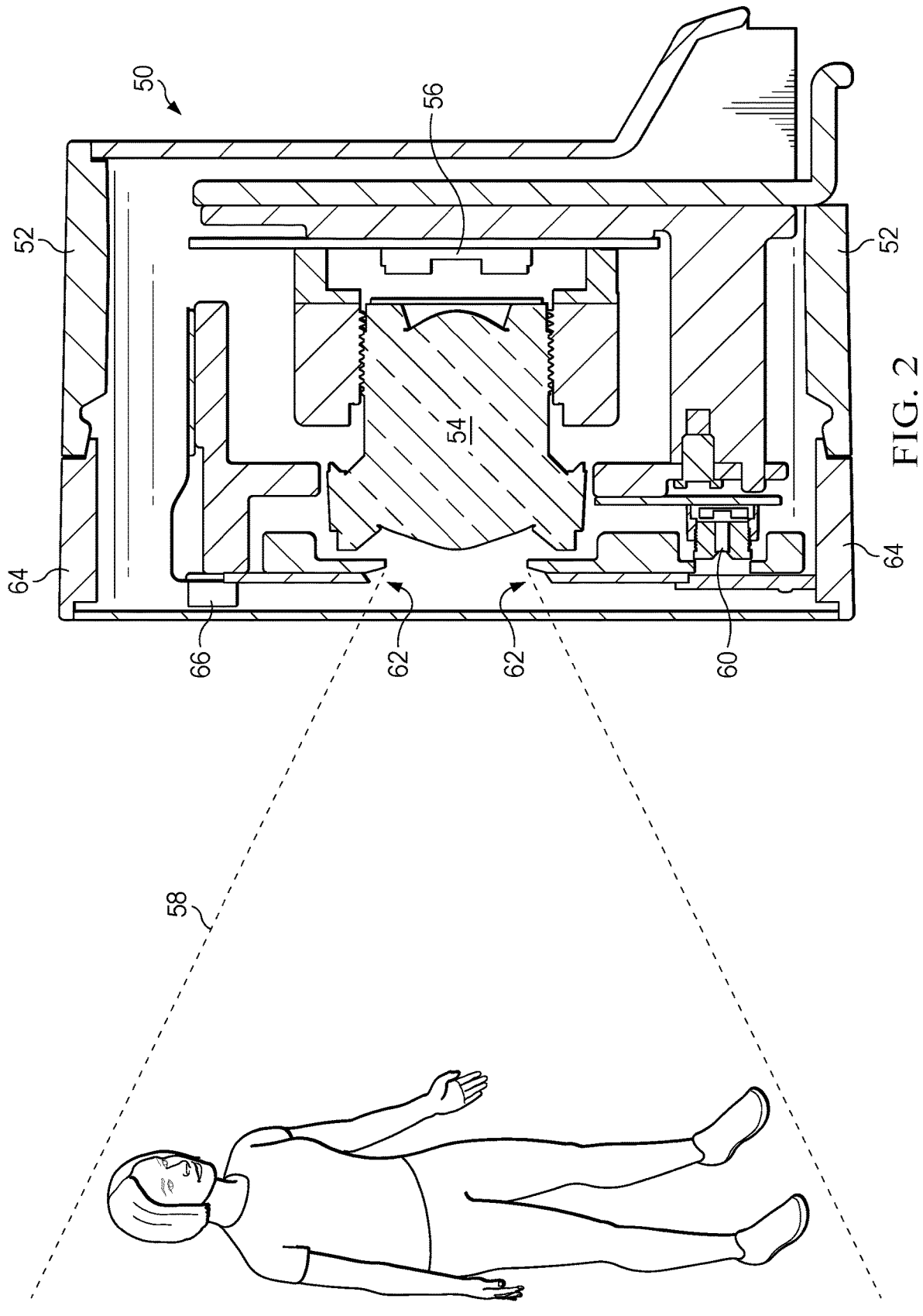
FIG. 2 depicts a side sectional view of a camera having a visual sensor and infrared sensor that are selectively blocked by a privacy shutter.

Referring now to FIG. 2, a side sectional view depicts a camera 50 having a visual image sensor 56 and infrared sensor 60 that are selectively blocked by a privacy shutter. A camera housing 52 holds a lens 54 aligned with a field of view 58 to direct light at an image sensor 56 that captures the visual spectrum light as digital information. An infrared sensor 60 couples at a front side of camera housing 52 to capture infrared light, such as to support facial recognition, user presence detection or low light image capture. A ring 64 couples to camera housing 52 around lens 54 and infrared sensor 60 and rotates to move a security shutter 62 over lens 54 that blocks light from entering. A separate blocking member extends from ring 64 towards lens 54 and rotates with ring 64 to block infrared sensor 60 from capturing infrared light. An actuator 66, such as motor or solenoid, engages with ring 64 to rotate the ring and thereby select privacy or open positions. Although the example embodiment depicts an actuator 66, in alternative embodiments, ring 64 is rotated by an end user with a physical interaction.

Figure 3A:
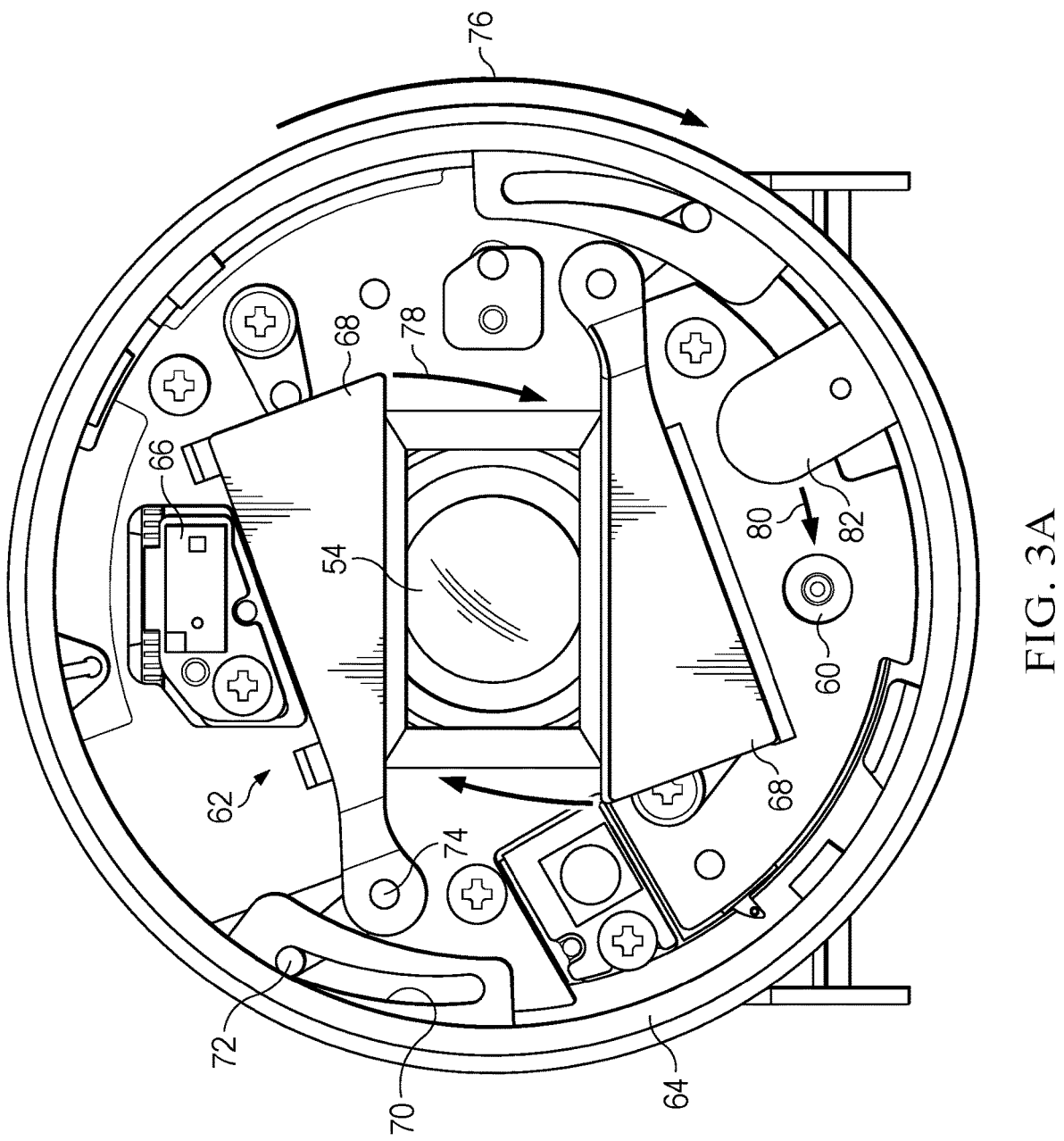
FIGS. 3A and 3B depict a front view of the camera security shutter with separate mechanisms for blocking visual image capture and infrared image capture.
Figure 3B:
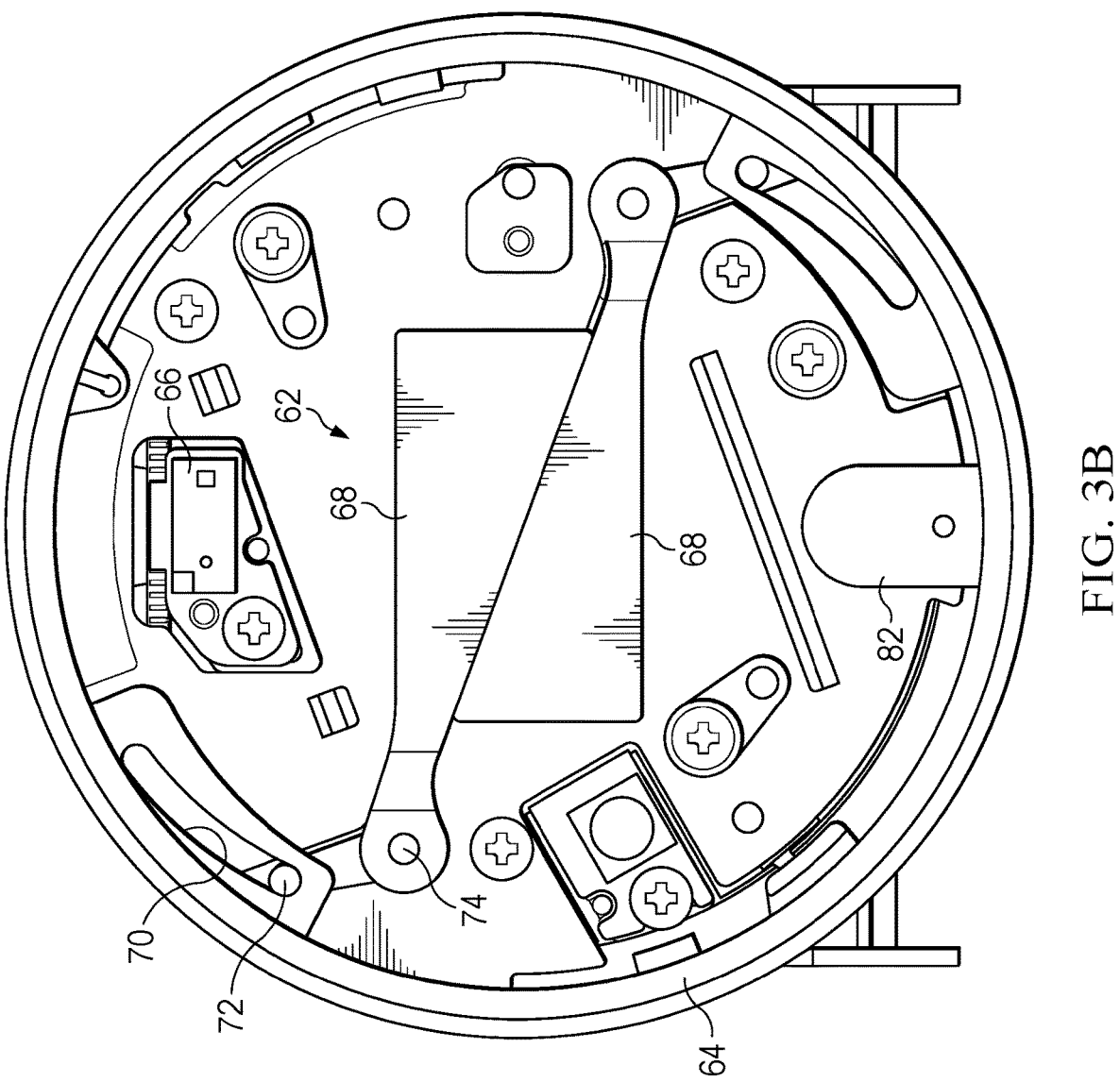

Referring now to FIGS. 3A and 3B, a front view of the camera security shutter 62 depicts the separate mechanisms for blocking visual image capture and infrared image capture. In the example embodiment, security shutter 62 rotationally couples a ring 64 to the front face of the camera housing around lens 54. Ring 64 rotates clockwise to move leaf members 68 over lens 54 as indicated by arrow 76, and counterclockwise to move leaf members 68 out from blocking lens 54. FIG. 3A depicts ring 64 fully rotated counterclockwise with lens 54 unblocked. FIG. 3B depicts ring 64 fully rotated clockwise to block lens 54 with leaf members 68 so that light does not enter into the camera to reach the visual images sensor. To move leaf members 68 to block and unblock the lens, each leaf member rotates about a pivot 74 based upon engagement of a pin 72 in a slot 70 of ring 64. Slot 70 has a variable distance to lens 54 along the length of the slot. In the fully exposed position of FIG. 3A, pin 72 has the greatest distance from lens 54 to pull leaf member 68 away from a central position by rotation about pivot 74, as indicated by arrows 78. In the fully blocked position of FIG. 3B, pin 72 has the least distance from lens 54 to push leaf member 68 towards a central position and over lens 54. In the example embodiment, an actuator 66 may turn ring 64 or ring 64 may be exposed at the camera housing exterior so that an end user may manually turn ring 64.

In the example embodiment of FIGS. 3A and 3B, leaf members 68 have a relatively minimal travel distance and size that will adapt to cameras of different lens and housing sizes without forcing additional footprint at the camera front face to accommodate the security shutter. In part, the small size of leaf members 68 is due to the sole focus on blocking and exposing only lens 54 without blocking infrared sensor 60. To accomplish this, ring member 64 includes a block member 82 that extends into the interior of ring 64 and towards lens 54. When ring 64 rotates clockwise, block member 82 rotates to a position in front of infrared sensor 60 to block capture of infrared images as indicated by arrow 80. When ring 64 rotates counterclockwise, block member 82 rotates to a position off to one side of infrared sensor 82 to expose the infrared sensor. In the example embodiment, leaf members 68 and block member 82 move synchronously based upon the rotational orientation of ring 64 to cover and expose the visual image sensor and infrared sensor.

Figure 4A:
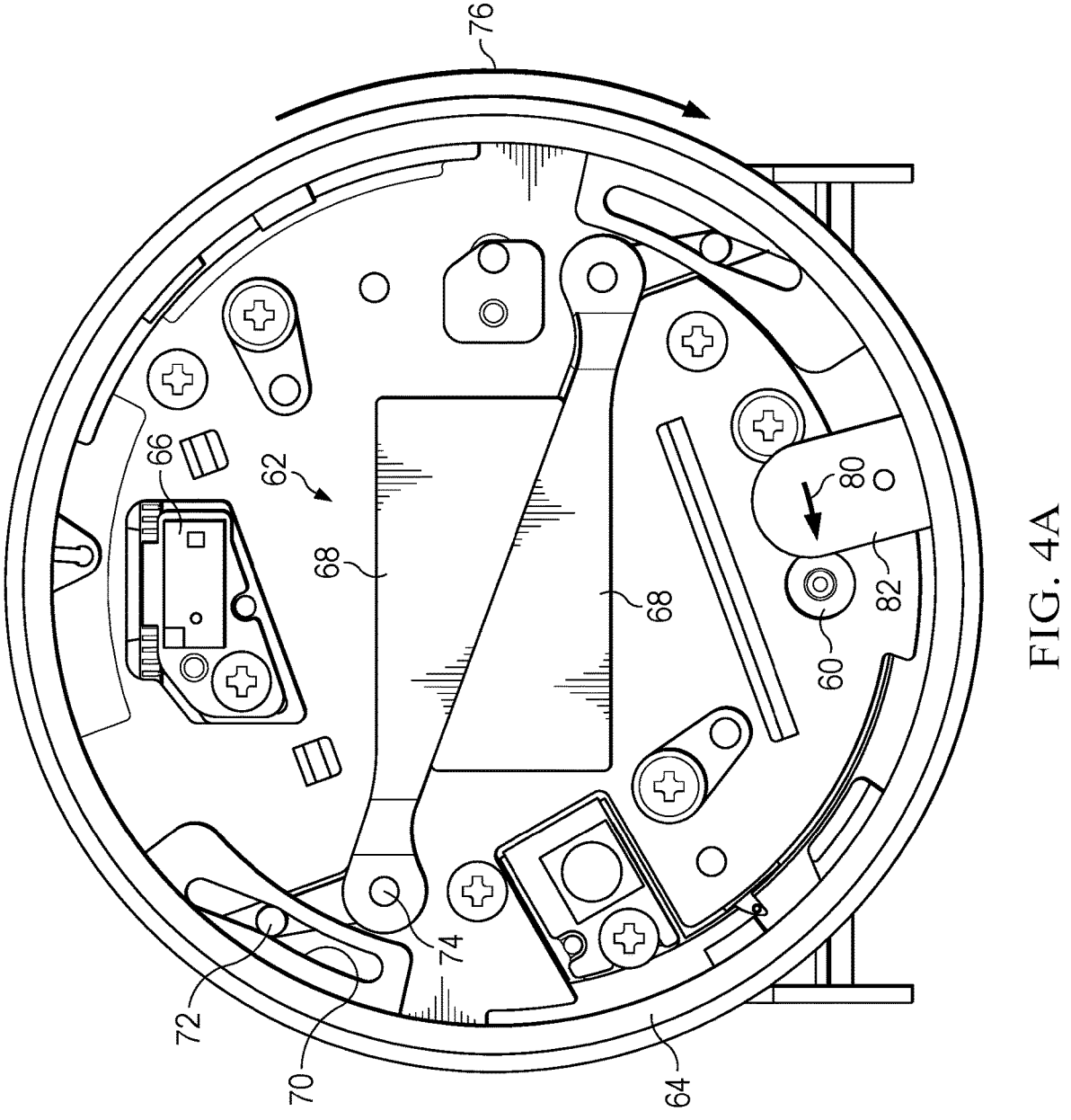
FIGS. 4A and 4B depict a front view of the camera security shutter with separate mechanisms for individually blocking visual image capture and infrared image capture.
Figure 4B:
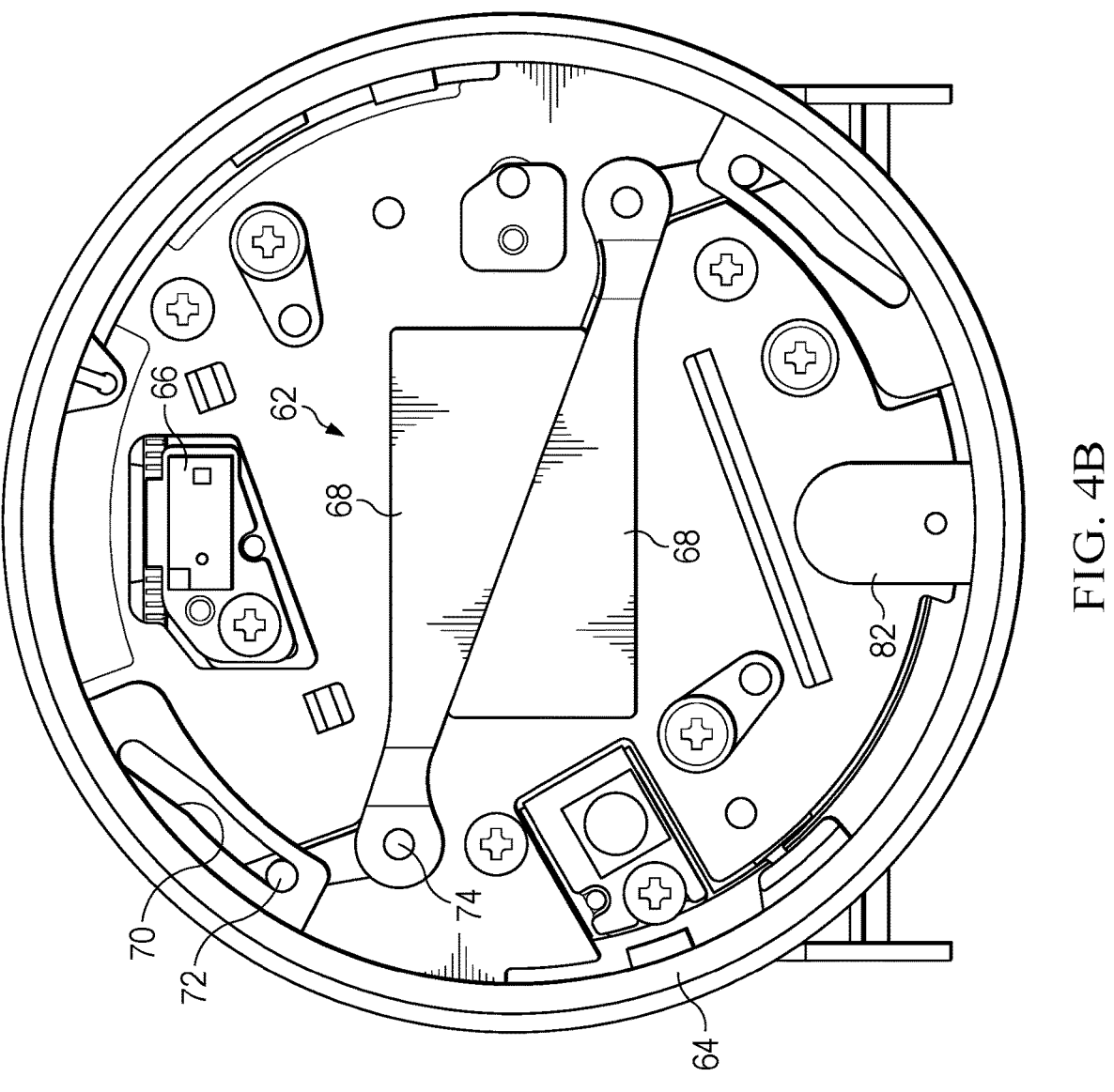

Referring now to FIGS. 4A and 4B, a front view of the camera security shutter depicts separate mechanisms for individually blocking visual image capture and infrared image capture. FIG. 4A depicts an alternative embodiment of security shutter 62 having elongated slot 70 that supports non-synchronous blocking of the visual image sensor and infrared sensor. In FIG. 4A, ring 64 has rotated partially clockwise as indicated by arrow 76 to close leaf members 68 as indicated by arrow 76 with slot 70 interacting with pin 72 to rotate leaf member 68 about pivot 74. The remaining length of slot 70 has a constant distance to lens 54 so that continued rotation of ring 64 maintains leaf members 68 in the closed position without applying additional closing force. Block member 82 rotates with ring 64 as indicated by arrow 80 but does not yet block infrared sensor 60 in FIG. 4A. The unblocked infrared sensor supports facial recognition and user presence detection by infrared sensor 60 while securing lens 54 from capturing visual images. FIG. 4B shows ring 64 fully rotated to align block member 82 with infrared sensor 60 so that both the visual image sensor and the infrared sensor are blocked. From the fully block state of FIG. 4B, a partial rotation counterclockwise exposes the infrared sensor while blocking the visual image sensor, and a full rotation counterclockwise as allowed by the length of the slot exposes both the visual image and infrared sensors. In alternative embodiments, a longer slot may be used to provide a configuration having the infrared sensor blocked while the visual sensor is exposed. Other types of configurations may be provided by mobbing the position of the block member, using multiple block members and changing the slot distance to the lens along a greater length so that the leaf members open and close.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions that process information;
   a memory disposed in the housing and interfaced with the processor, the memory operable to store the instructions and information; and
   a camera interfaced with the processor, the camera having a lens, an image sensor, and infrared sensor and a shutter, the lens directing light to the image sensor, the image sensor capturing visual images, the shutter having a ring configured to rotate around the lens, the ring having an opening aligned with the lens, the ring coupled with a leaf that blocks the lens when the ring rotates in a first direction and exposes the lens when the ring rotates in a second direction, the ring having an extension directed inward towards the lens and into the ring opening, the extension aligned to block the infrared sensor when the ring rotates in the first direction and expose the infrared sensor when the ring rotates in the second direction.

2. The information handling system of claim 1 further comprising:
   a pin extending from the leaf into a slot of the ring; and
   a pivot fixed relative to the lens and rotationally coupled to the leaf;

wherein the slot radius relative to the lens decreases at the pin when the ring rotates in the first direction and increases at the pin when the ring rotates in the second direction.

3. The information handling system of claim 2 wherein the ring extension aligns with the infrared sensor as the leaf covers the lens.

4. The information handling system of claim 2 wherein the ring extension exposes the infrared sensor until after rotation of the ring covers the lens.

5. The information handling system of claim 4 wherein the ring slot has a length, the leaf having a full movement to block the lens when the ring rotates the pin in a first position partially in the slot length, the ring extension not aligned with the infrared sensor at the first position, the leaf station-ary over the lens when the ring rotates to a second position with the pin to the slot length and the ring extension aligned with the infrared sensor.

6. The information handling system of claim 2 wherein the shutter has a first leaf and a second leaf, each leaf covering one-half the lens when the shutter blocks the lens.

7. The information handling system of claim 2 further comprising a peripheral display separate from the housing and interfaced with the processor to present the information as visual images, the camera being integrated in the periph-eral display.

8. The information handling system of claim 2 wherein the camera integrates in the housing.

9. The information handling system of claim 2 wherein the camera is configured as a peripheral camera separate from the housing and interfaced with the processor.

10. A method for blocking an information handling sys-tem camera field of view, the method comprising:

rotating a ring coupled around a lens of the camera in a first direction from a first position to a second position, the ring having an opening aligned with the lens;

translating the rotating to move first and second leaf members over the lens to block light from entering the lens; and blocking an infrared sensor with a blocking member directly coupled to the ring and extending into the opening that rotates over the infrared sensor in the second position.

11. The method of claim 10 further comprising:

rotating the ring in a second direction from the second position to the first position;

translating the rotating to move the first and second leaf members from over the lens to expose the lens to accept light; and unblocking the infrared sensor from the blocking member by rotating the blocking member with the ring to expose the infrared sensor.

12. The method of claim 11 further comprising:

coupling the first leaf member to a first camera pivot fixed relative to the lens and to a first ring slot with a first pin extending from the leaf member into the first ring slot;

coupling the second leaf member to a second camera pivot fixed relative to the lens and to a second ring slot with a second pin extending from the leaf member into the second ring slot; and moving the first and second leaf members by changing the radius of the first and second slots relative to the camera lens along the length of the first and second slots, the radius decreasing when the ring rotates in the first direction and increasing when the ring rotates in the second direction.

13. The method of claim 12 further comprising:

closing the first and second leaf members over the lens with movement through a first rotational position of less than the length of the first and second slots; and exposing the infrared sensor with the first and second leaf members blocking the lens.

14. The method of claim 13 further comprising:

rotating the ring the full length of the slot from the first rotational position while maintaining the first and sec-ond leaf members closed over the lens; and covering the infrared sensor with the blocking member when the ring rotates the full length of the slot.

15. The method of claim 10 further comprising integrating the camera in a peripheral display.

16. A camera comprising:

a lens;

an image sensor;

an infrared sensor;

a shutter, the lens directing light to the image sensor, the image sensor capturing visual images, the shutter hav-ing a ring configured to rotate around the lens, the ring coupled with a leaf member that blocks the lens when the ring rotates in a first direction and exposes the lens when the ring rotates in a second direction, the ring having an extension directed inward towards the lens and aligned to block the infrared sensor when the ring rotates in the first direction and expose the infrared sensor when the ring rotates in the second direction;

a pin extending from the leaf member into a slot of the ring; and a pivot fixed relative to the lens and rotationally coupled to the leaf;

wherein the slot radius relative to the lens decreases at the pin when the ring rotates in the first direction and increases at the pin when the ring rotates in the second direction.

17. The camera of claim 16 wherein the ring extension aligns with the infrared sensor as the leaf covers the lens.

18. The camera of claim 16 wherein the ring extension exposes the infrared sensor until after rotation of the ring covers the lens and then covers the infrared sensor after additional rotation of the ring.

19. The camera of claim 18 wherein the ring slot has a length, the leaf member having a full movement to block the lens when the ring rotates the pin in a first position partially in the slot length, the ring extension not aligned with the infrared sensor at the first position, the leaf member station-ary over the lens when the ring rotates to a second position with the pin to the slot length and the ring extension aligned with the infrared sensor.

* * * * *